United States Patent [19]

Milde, Jr.

[11] 4,014,237

[45] Mar. 29, 1977

[54] MUSICAL NOTE DETECTING APPARATUS

[76] Inventor: Karl F. Milde, Jr., 198 Baltic St., Brooklyn, N.Y. 11201

[22] Filed: Aug. 28, 1975

[21] Appl. No.: 608,707

Related U.S. Application Data

[63] Continuation of Ser. No. 231,016, March 1, 1972, abandoned, which is a continuation of Ser. No. 79,044, Oct. 8, 1970, abandoned, which is a continuation-in-part of Ser. No. 756,857, Sept. 3, 1968, abandoned.

[52] U.S. Cl. ............................... 84/1.12; 84/1.21; 84/453; 330/126
[51] Int. Cl.² ...................................... G10G 1/00
[58] Field of Search ............... 84/1.01, 1.11, 1.12, 84/1.19, 1.21, 1.24, 1.28, 453; 330/29, 126; 346/35

[56] References Cited

UNITED STATES PATENTS

| | | | |
|---|---|---|---|
| 2,072,708 | 3/1937 | Case | 330/126 |
| 2,340,364 | 2/1944 | Bedford | 330/126 X |
| 2,558,868 | 7/1951 | McCarty | 330/126 X |
| 2,606,971 | 8/1952 | Scott | 330/126 X |
| 2,606,972 | 8/1952 | Scott | 330/126 |
| 2,606,973 | 8/1952 | Scott | 330/126 X |
| 2,949,579 | 8/1960 | Wu | 330/126 X |
| 3,539,701 | 11/1970 | Milde | 84/1.28 |

Primary Examiner—Stanley J. Witkowski

[57] ABSTRACT

Apparatus for automatically detecting the pitch of individual notes of music represented in analog form by an electrical signal. The apparatus includes an arrangement of band-pass filters, connected in parallel, for receiving the electrical signal and passing selected portions thereof which contain the frequencies of the well-tempered scale. According to the invention, means are provided for varying the sensitivity of the pitch detecting apparatus in dependence upon the loudness of the notes to be detected to thereby inhibit the detection of harmonics.

8 Claims, 2 Drawing Figures

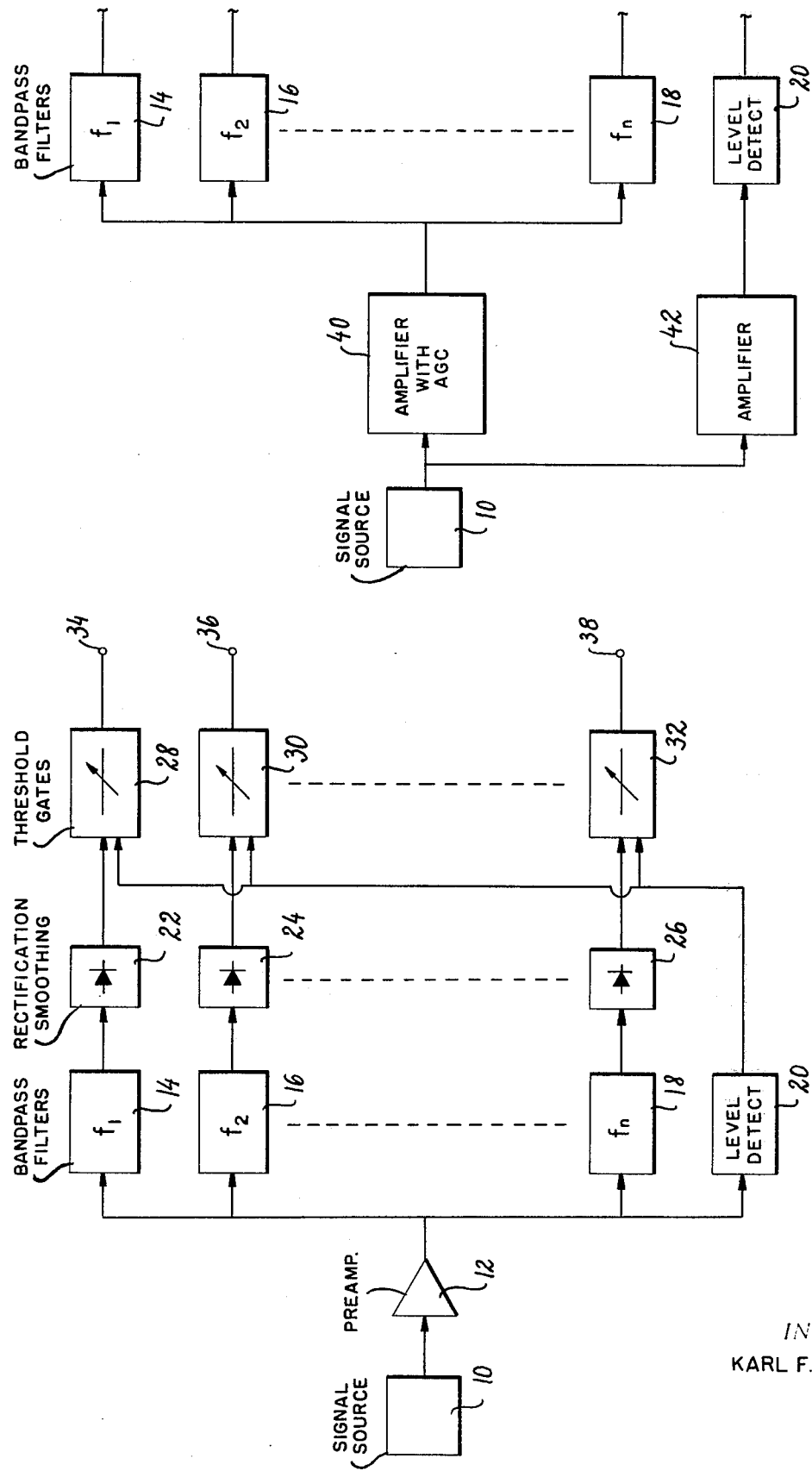

MUSICAL NOTE DETECTING APPARATUS

CROSS-REFERENCE TO RELATED APPLICATION

This is a continuation of application Ser. No. 231,016, filed Mar. 1, 1972, and now abandoned which is a continuation of application Ser. No. 79,044, filed Oct. 8, 1970, and now abandoned which is a continuation-in-part of application Ser. No. 756,857, filed Sept. 3, 1968, and now abandoned.

BACKGROUND OF THE INVENTION

The present invention relates to apparatus for automatically detecting the pitch of the individual notes of a musical composition which is represented in analog form by an electrical signal.

Apparatus for automatically detecting the pitch of musical notes is known in the art. Typically, this apparatus includes a plurality of band-pass filters connected in parallel. Such apparatus is illustrated and described, for example, in the U.S. Pat. No. 2,514,490 to John M. Hanert and the U.S. Pat. No. 3,277,245 to Imre Sponga.

Musical pitch detecting apparatus of this kind operates to detect the fundamentals of the individual notes of the musical composition. The threshold of detection is chosen sufficiently high so that only the fundamentals (and not the harmonics) of the individual notes of music will be detected.

This known apparatus will function properly provided that the musical notes which are to be detected are all of equal loudness. If, however, the music has a dynamic range that includes both soft and loud passages, the apparatus, if adjusted to detect the fundamentals of soft notes, will detect the harmonics of loud notes. In particular, if the threshold of detection is chosen sufficiently low so that the signals representing the fundamentals of soft notes exceed the threshold, the signals representing the harmonics of loud notes exceed this threshold as well.

SUMMARY OF THE INVENTION

An object of the present invention, therefore, is to provide apparatus for automatically detecting the fundamental frequency of individual notes of a musical composition of varying loudness without detecting the note harmonics.

This object, as well as other objects which will become apparent in the discussion that follows, is achieved, according to the present invention, by varying the sensitivity of the pitch-detecting apparatus in dependence upon the loudness of the notes.

This variation in the sensitivity of the apparatus may be accomplished in several ways. According to one preferred embodiment of the present invention, each of the band-pass filters of the pitch-detecting apparatus is connected to a threshold gate that has a variable threshold level. This threshold level can be changed manually by the operator of the apparatus or can be varied automatically in dependence upon the loudness of the notes to be detected.

According to a particular feature of the present invention, the threshold level of the threshold gate is adjusted in such a way that higher frequencies are detected with increasingly higher threshold levels. In this way, the pitch-detecting apparatus will exhibit a preference for lower frequencies and, in turn, the fundamentals of the musical notes.

According to another preferred embodiment of the present invention, the sensitivity of the pitch-detecting apparatus is controlled by means of an amplifier which includes an automatic gain control. The electrical signal representing the musical notes is passed through this amplifier and thereby modified so that the average amplitude of this signal remains at a constant level. The signal is then passed through the parallel connected bandpass filters which determine the presence of the fundamentals of the musical notes.

BRIEF DESCRIPTION OF THE DRAWINGS

FIG. 1 is a block diagram of pitch-detecting apparatus which includes a sensitivity varying device according to one preferred embodiment of the present invention.

FIG. 2 is a block diagram of pitch-detecting apparatus which includes a sensitivity varying device according to another preferred embodiment of the present invention.

DESCRIPTION OF THE PREFERRED EMBODIMENTS

The preferred embodiments of the present invention will now be described in connection with FIGS. 1 and 2 of the drawings.

FIG. 1 shows apparatus for detecting the pitch and level of music represented in analog form by an electrical signal. The signal is produced by a signal source 10 such as a microphone or a phonograph or tape recording playback device. The signal is amplified, if necessary, by a preamplifier 12 and passed to a plurality of band-pass filters 14, 16 and 18 connected in parallel. Each of the band-pass filters is tuned to a different frequency $f_1, f_2 \ldots f_n$; these frequencies are preferably the acoustic frequencies of the well-tempered scale.

The electrical signal representing music in analog form is also passed to a level detector 20 which produces an output voltage proportional to the average value of its input. In practice, this detector can take the form of a simple rectifier and smoothing circuit. The output of each band-pass filter 14, 16, 18 is connected to a bridge rectifier and smoothing circuit 22, 24, 26, respectively. These latter circuits have a similar function and may have the same construction as the level detecting circuit 20.

The output of each rectifier and smoothing circuit 22, 24, 26 is connected to a threshold gate 28, 30, 32, respectively. These threshold gates, which are sometimes called "Schmitt trigger circuits" function to produce an output signal if and only if they receive an input signal which exceeds a prescribed threshold. As indicated within the block representing each threshold gate, the threshold level of each gate is variable. Such threshold gates are well known in the art and are described, for example, on pages 330 and 331 of the McGraw-Hill Encyclopedia of Science and Technology, Vol. 3 (Ed. 1960).

The threshold gates of FIG. 1 may each be provided with a potentiometer which permits the manual adjustment of their threshold level. This threshold level may also be adjusted automatically by the output signal produced by the level detector 20. As shown in FIG. 1, this output signal is supplied to each of the threshold gates to cause the threshold level to increase with an increase in the musical loudness. In practice, this variation in the threshold level may be accomplished with the output voltage of the level detector 20 by applying this voltage to vary the bias within the threshold gates.

The circuit of FIG. 1 operates in the following manner: When an electrical signal representing one or more musical notes is produced by the signal source 10, the band-pass filters 14, 16, 18 pass those fundamentals and harmonics which lie close to the frequency of each filter. The signal passed by these filters is rectified and smoothed by the respective circuits 22, 24, 26 and applied to the respective threshold gates 28, 30, 32. If the signals received by the threshold gates exceed the threshold levels of the gates these gates produce a voltage output at the respective terminals 34, 36, 38. Each of these output terminals represents a separate note of the well-tempered scale and the existence of a voltage at a particular terminal signifies that the note represented by that terminal is being "played".

Since the frequency spectrum of a given musical note is, in practice, made up of a large number of harmonics as well as the fundamental frequency of the note, the various band-pass filters 14, 16, 18 will pass the harmonics as well. If the harmonics are particularly strong, and the level of the threshold gates is set low enough to permit the gate to produce an output voltage during soft musical passages as well as loud, the harmonics may also be detected along with the fundamentals.

To avoid this undesired effect, the level detector 20 controls the level of the threshold gates in such a way that soft musical passages give rise to low threshold levels and loud passages to high threshold levels. The threshold levels are accordingly maintained at a point which permits the threshold gates to trigger in response to the strong fundamentals but not to the weaker harmonics.

The manual adjustment of the levels of the threshold gates not only permits the gates to be adjusted to the point of best operation but also permits the threshold levels of different gates to be differently adjusted. It is accordingly possible to adjust the level of the threshold gate connected to the filter of lowest frequency to the lowest level and successively increase the levels of the threshold gates connected to the filters of successively increasing frequency. Such an adjustment scheme will "bias" the detection apparatus in favor of low notes; that is, in favor of fundamentals in preference to the higher frequency harmonics.

FIG. 2 illustrates a second embodiment of the present invention for varying the sensitivity of the pitch detecting apparatus. The pitch detecting apparatus of FIG. 2 likewise consists of band-pass filters 14, 16, 18 and includes whatever other devices, such as rectification and smoothing circuits and threshold gates, that may be necessary to produce the desired output.

In this embodiment, the band-pass filters are supplied an electrical signal of constant average amplitude. This signal is produced by the signal source 10 and is passed to an amplifier 40 which includes an automatic gain control (AGC), of well-known or conventional design. Such an amplifier is described, for example, in the U.S. Pat. No. 2,949,579 to Wu.

The electrical signal which represents the musical notes in analog form varies in average amplitude according to the loudness of the notes. As this signal is received by the amplifier 40 from the signal source 10 it is amplified by the amount necessary to produce a signal of constant average amplitude.

The level information in the electrical signal produced by the signal source 10 is detoured through an amplifier 42 to the level detector 20.

It will be understood that the present invention is susceptible to various modifications, changes and adaptations as will occur to those skilled in the art. It is therefore intended that the scope of the present invention be limited only by the following claims or their equivalents.

I claim:

1. In apparatus for automatically detecting the pitch of individual notes of music comprising input means for receiving an electrical signal representing said music in analog form; frequency detecting means, coupled to said input means, for detecting the presence of musical note frequencies in said electrical signal; and musical note determining means, coupled to said frequency detecting means, for determining the notes of said music represented in said electrical signal in response to presence of said frequencies; said pitch-detecting apparatus having a sensitivity of detection such that the determination of the presence of a note is dependent upon the strength of said electrical signal; the improvement wherein said pitch-detecting apparatus further comprises means, coupled to said input means, for varying the sensitivity of said pitch-detecting apparatus in inverse relation to the strength of said signal, thereby reducing the sensitivity of the apparatus with an increase in the loudness and increasing the sensitivity of the apparatus with a reduction in the loudness of said notes;

whereby said pitch-detecting apparatus is operative to determine the presence of musical note fundamentals, but not harmonics, notwithstanding variations in the loudness of said notes.

2. The apparatus defined in claim 1, wherein said frequency detecting means includes a plurality of filter means for selectively passing portions of said electrical signal containing frequencies in a prescribed range.

3. The apparatus defined in claim 2, wherein said filter means are bandpass filters and are connected to said input means in parallel.

4. The apparatus defined in claim 1, wherein said musical note determining means includes threshold means, connected to said frequency detecting means, for selecting musical notes which have frequency amplitudes that are greater than a prescribed threshold, and wherein said improvement includes means for varying said threshold in dependence upon the loudness of said notes.

5. The apparatus defined in claim 4, wherein said threshold means includes manually operable control means for adjusting said threshold.

6. The apparatus defined in claim 5, wherein said threshold is chosen at higher levels at higher frequencies.

7. The apparatus defined in claim 4, wherein said threshold varying means includes means, connected to said input means, for automatically detecting the loudness of said notes and means, connected to said loudness detecting means, for automatically varying said threshold in dependence upon the loudness of said notes.

8. The apparatus defined in claim 1, wherein said improvement includes amplifier means, connected between said input means and said frequency detecting means, for maintaining the average amplitude of said electrical signal at a constant level.

* * * * *